United States Patent
Jacoby et al.

(10) Patent No.: US 8,645,537 B2
(45) Date of Patent: Feb. 4, 2014

(54) DEEP PACKET SCAN HACKER IDENTIFICATION

(75) Inventors: Brian Jacoby, Reston, VA (US); Christopher J. Wright, Leesburg, VA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 162 days.

(21) Appl. No.: 13/193,996

(22) Filed: Jul. 29, 2011

(65) Prior Publication Data

US 2011/0289559 A1    Nov. 24, 2011

Related U.S. Application Data

(63) Continuation of application No. 12/758,456, filed on Apr. 12, 2010, now Pat. No. 8,001,244, which is a continuation of application No. 09/894,918, filed on Jun. 29, 2001, now Pat. No. 7,725,587, which is a continuation-in-part of application No. 09/666,140, filed on Sep. 20, 2000, now Pat. No. 7,711,790.

(60) Provisional application No. 60/227,309, filed on Aug. 24, 2000, provisional application No. 60/278,423, filed on Mar. 26, 2001.

(51) Int. Cl.
*G06F 15/173* (2006.01)
*G06F 15/16* (2006.01)

(52) U.S. Cl.
USPC ........... 709/225; 709/223; 709/224; 709/227; 709/217; 709/218; 709/219; 726/3

(58) Field of Classification Search
USPC .............. 709/223–225, 227, 217–219; 726/3
See application file for complete search history.

(56) References Cited

U.S. PATENT DOCUMENTS

| | | | |
|---|---|---|---|
| 5,444,705 | A | 8/1995 | Olnowich et al. |
| 5,475,839 | A | 12/1995 | Watson et al. |
| 5,546,390 | A | 8/1996 | Stone |

(Continued)

FOREIGN PATENT DOCUMENTS

| | | |
|---|---|---|
| EP | 0720333 A2 | 7/1996 |
| EP | 0889668 | 1/1999 |
| WO | WO 99/03238 A2 | 1/1999 |
| WO | WO 99/33188 A2 | 7/1999 |
| WO | WO 02/19661 A2 | 3/2002 |

OTHER PUBLICATIONS

Allman, Eric, Sendmail Installation and Operation Guide Version 8.310 for Sendmail Version 8.10, Sendmail, Inc., (84 pages).

(Continued)

*Primary Examiner* — Alina N Boutah
(74) *Attorney, Agent, or Firm* — Banner & Witcoff, Ltd.

(57) ABSTRACT

Securing an accessible computer system typically includes receiving a data packet that includes a payload portion and an attribute portion, where the data packet is communicated between at least one access requestor and at least one access provider. At least the payload portion of the received data packet typically is monitored, where monitoring includes scanning the payload portion for at least one predetermined pattern. When the payload portion is determined to include at least one predetermined pattern, access by the access requestor to the access provider may be controlled. Monitoring the data packet may include scanning the payload portion while handling the data packet with a switch. Controlling access may include denying access by the access requestor to the access provider.

20 Claims, 8 Drawing Sheets

(56) References Cited

U.S. PATENT DOCUMENTS

| | | |
|---|---|---|
| 5,548,533 A | 8/1996 | Gao et al. |
| 5,577,197 A | 11/1996 | Beck |
| 5,606,668 A | 2/1997 | Shwed |
| 5,619,648 A | 4/1997 | Canale et al. |
| 5,634,040 A | 5/1997 | Her et al. |
| 5,699,514 A | 12/1997 | Durinovic-Johri et al. |
| 5,704,047 A | 12/1997 | Schneeberger |
| 5,732,212 A | 3/1998 | Perholz et al. |
| 5,742,587 A | 4/1998 | Zornig et al. |
| 5,805,810 A | 9/1998 | Maxwell |
| 5,857,188 A | 1/1999 | Douglas |
| 5,862,325 A | 1/1999 | Reed et al. |
| 5,872,917 A | 2/1999 | Hellman |
| 5,877,724 A | 3/1999 | Davis |
| 5,884,246 A | 3/1999 | Boucher et al. |
| 5,923,848 A | 7/1999 | Goodhand et al. |
| 5,999,932 A | 12/1999 | Paul |
| 6,018,619 A | 1/2000 | Allard et al. |
| 6,026,440 A | 2/2000 | Shrader et al. |
| 6,038,563 A | 3/2000 | Bapat et al. |
| 6,044,260 A | 3/2000 | Eaton et al. |
| 6,052,709 A | 4/2000 | Paul |
| 6,072,942 A | 6/2000 | Stockwell et al. |
| 6,088,736 A | 7/2000 | Manning et al. |
| 6,092,115 A | 7/2000 | Choudhury et al. |
| 6,105,012 A | 8/2000 | Chang et al. |
| 6,161,130 A | 12/2000 | Horvitz et al. |
| 6,167,029 A | 12/2000 | Ramakrishnan |
| 6,167,434 A | 12/2000 | Pang |
| 6,182,226 B1 | 1/2001 | Reid et al. |
| 6,195,680 B1 | 2/2001 | Goldszmidt et al. |
| 6,205,551 B1 | 3/2001 | Grosse |
| 6,212,184 B1 | 4/2001 | Venkatachary et al. |
| 6,219,694 B1 | 4/2001 | Lazaridis et al. |
| 6,219,706 B1 | 4/2001 | Fan et al. |
| 6,219,786 B1 | 4/2001 | Cunningham et al. |
| 6,237,027 B1 | 5/2001 | Namekawa |
| 6,256,739 B1 | 7/2001 | Skopp et al. |
| 6,266,664 B1 | 7/2001 | Russell-Falla et al. |
| 6,286,049 B1 | 9/2001 | Rajakarunanayake et al. |
| 6,321,267 B1 | 11/2001 | Donaldson |
| 6,330,590 B1 | 12/2001 | Cotten |
| 6,337,899 B1 | 1/2002 | Alcendor et al. |
| 6,351,764 B1 | 2/2002 | Voticky et al. |
| 6,351,794 B1 | 2/2002 | Spilo et al. |
| 6,360,254 B1 | 3/2002 | Linden et al. |
| 6,418,420 B1 | 7/2002 | DiGiorgio et al. |
| 6,430,619 B1 | 8/2002 | Sitaraman et al. |
| 6,484,203 B1 | 11/2002 | Porras et al. |
| 6,496,866 B2 | 12/2002 | Attanasio et al. |
| 6,507,866 B1 | 1/2003 | Barchi |
| 6,529,955 B1 | 3/2003 | Sitaraman et al. |
| 6,535,517 B1 | 3/2003 | Arkko et al. |
| 6,542,583 B1 | 4/2003 | Taylor |
| 6,567,919 B1 | 5/2003 | Yanagihara et al. |
| 6,580,790 B1 | 6/2003 | Henry et al. |
| 6,591,291 B1 | 7/2003 | Gabber et al. |
| 6,591,301 B1 | 7/2003 | Li et al. |
| 6,601,175 B1 | 7/2003 | Arnold et al. |
| 6,615,241 B1 | 9/2003 | Miller et al. |
| 6,636,894 B1 | 10/2003 | Short et al. |
| 6,643,685 B1 | 11/2003 | Millard |
| 6,643,686 B1 | 11/2003 | Hall |
| 6,654,373 B1 * | 11/2003 | Maher et al. ............... 370/392 |
| 6,654,787 B1 | 11/2003 | Aronson et al. |
| 6,662,230 B1 * | 12/2003 | Eichstaedt et al. ............ 709/229 |
| 6,678,835 B1 | 1/2004 | Shah et al. |
| 6,691,156 B1 | 2/2004 | Drummond et al. |
| 6,701,522 B1 | 3/2004 | Rubin et al. |
| 6,725,270 B1 | 4/2004 | Yu et al. |
| 6,728,270 B1 | 4/2004 | Meggers et al. |
| 6,732,149 B1 | 5/2004 | Kephart |
| 6,738,814 B1 * | 5/2004 | Cox et al. ..................... 709/225 |
| 6,742,123 B1 | 5/2004 | Foote |
| 6,742,128 B1 | 5/2004 | Joiner |
| 6,748,422 B2 | 6/2004 | Morin et al. |
| 6,751,668 B1 | 6/2004 | Lin et al. |
| 6,757,836 B1 | 6/2004 | Kumar et al. |
| 6,763,467 B1 | 7/2004 | Radatti et al. |
| 6,772,334 B1 | 8/2004 | Glawitsch |
| 6,778,498 B2 | 8/2004 | McDysan |
| 6,789,203 B1 | 9/2004 | Belissent |
| 6,829,635 B1 | 12/2004 | Townshend |
| 6,829,772 B2 | 12/2004 | Foote et al. |
| 6,834,310 B2 | 12/2004 | Munger et al. |
| 6,839,759 B2 | 1/2005 | Larson et al. |
| 6,868,436 B1 | 3/2005 | Fleming, III |
| 6,868,498 B1 | 3/2005 | Katsikas |
| 6,894,972 B1 | 5/2005 | Phaal |
| 6,910,135 B1 | 6/2005 | Grainger |
| 7,032,023 B1 | 4/2006 | Barrett et al. |
| 7,069,313 B2 | 6/2006 | Alam et al. |
| 7,103,599 B2 | 9/2006 | Buford et al. |
| 7,103,846 B1 | 9/2006 | Shafrir et al. |
| 7,181,766 B2 * | 2/2007 | Bendinelli et al. ............... 726/15 |
| 7,301,899 B2 | 11/2007 | Goldstone |
| 7,391,760 B1 | 6/2008 | Caldwell et al. |
| 7,398,317 B2 | 7/2008 | Chen et al. |
| 7,437,457 B1 | 10/2008 | Eisendrath et al. |
| 7,454,499 B2 | 11/2008 | Cantrell et al. |
| 7,464,410 B1 | 12/2008 | Halasz et al. |
| 2001/0023454 A1 | 9/2001 | Fitzgerald |
| 2002/0103916 A1 | 8/2002 | Chen et al. |
| 2002/0107953 A1 | 8/2002 | Ontiveros et al. |
| 2002/0108059 A1 | 8/2002 | Canion et al. |
| 2003/0145232 A1 * | 7/2003 | Poletto et al. ................. 713/201 |
| 2004/0064515 A1 | 4/2004 | Hockey |
| 2006/0136590 A1 | 6/2006 | Barrett et al. |
| 2011/0213869 A1 * | 9/2011 | Korsunsky et al. ........... 709/223 |

OTHER PUBLICATIONS

Allowing controlled SMTP relaying in Sendmail 8.9, (2 pages), http://web.archive.org/web/20000510213022/www.sendmail.ong/tips/relaying.html.

Anti-Spam Configuration Control, (5 pages), http://web.archive.org/web/20000520064211/www.sendmail.org/m4/anti-spam.html.

Anti-Spam Provisions in Sendmail 8.8, (4 pages), http://web.archive.org/web/20000510040556/www.sendmail.org/antispam.html.

Boutin, Paul, RFC 2476: Message Submission Agent, (3 pages), http://web.archive.org/web/200010270602105/sendmail.net/?feed=rfc2476.

Boutin, Paul, RFC 2554: SMTP Authentication, (4 pages), http://web.archive.org/web/20001016141928/sendmail.net/?feed=rfc2554.

Durham, Mark, Spam Control in 8.10, (3 pages), http://web.archive.org/web/20000618042433/sendmail.net/?feed=interview810-5.

Godfrey, J., "Instant Spam: It's Tough to Swallow," Home Office Computing, [online] vol. 16, No. 11, p. 24 [retrieved on Dec. 29, 2004]. Retrieved from <URL: http://proquest.umi.com/pdgweb?index=21&sid=2&srchmode=l&vinst=PROD&fmt=4&.

Relaying Denied/Allowed (in sendmail 8.8/8.9), Last Update Feb. 11, 2000, (2 pages), http://web.archive.org/web/20000418000700/www.sendmail.org/~ca/email/relayingdenied . . . ,.

rfc2222, J. Myers, Simple Authentication and Security Layer (SASL), (16 pages), Oct. 1997, The Internet Society (1997), http://web.archive.org/web/20001027153713/www.cis.ohio-state.edu/htbin/rfc/rfc2222.ht . . . ,.

rfc2554, J. Myers, SMTP Service Extension for Authentication, (11 pages), Mar. 1999, The Internet Society (1999), http://web.archive.org/web/20001018181229/www.cis.ohio-state.edu/htbin/rfc/rfc2554.htä€¦,.

USPTO Non-Final Office Action issued in U.S. Appl. No. 10/698,933, mailed Jun. 10, 2009, (16 pages).

Using SMTP AUTH in Sendmail 8.10, (2 pages), Mar. 27, 2000, http://web.archive.org/web/20001016174022/sendmail.net/?feed-usingsmthpauth.

* cited by examiner

DEEP PACKET SCAN HACKER IDENTIFICATION

CROSS REFERENCE TO RELATED APPLICATIONS

This application is a continuation of U.S. application Ser. No. 12/758,456 (now allowed), filed Apr. 12, 2010 now U.S. Pat. No. 8,001,244 and titled "Deep Packet Scan Hacker Identification," which is a continuation of U.S. application Ser. No. 09/894,918 (now U.S. Pat. No. 7,725,587), filed Jun. 29, 2001, and titled "Deep Packet Scan Hacker Identification", which is a continuation-in-part of U.S. application Ser. No. 09/666,140 (now U.S. Pat. No. 7,711,790), filed Sep. 20, 2000, and titled "Securing an Accessible Computer System," which claims the benefit of U.S. Provisional Application No. 60/227,309, filed Aug. 24, 2000, and titled "Securing An Accessible Computer System," and U.S. Provisional Application No. 60/278,423, filed Mar. 26, 2001, and titled "Deep Packet Scan Hacker Identification," all of which are incorporated herein by reference.

TECHNICAL FIELD

This invention relates to securing an accessible computer system.

BACKGROUND

Accessible computer systems have proven susceptible to various attacks by computer hackers. In one type of computer attack, a hacker attempts to gain unauthorized access to an online computer service. In this type of attack, the hacker may attempt to crack the password associated with the known logon identification. The hacker may use a computer program that associates passwords with the logon identification in rapid succession. This type of attack may allow the hacker to gain unauthorized access to a particular user's personal account on the online computer service. The hacker also may attempt to use the unauthorized access to sabotage the online computer service. When subject to such attacks, accessible computer systems may be forced to cease operation.

SUMMARY

In one general aspect, securing an accessible computer system typically includes receiving a data packet that includes a payload portion and an attribute portion, where the data packet is communicated between at least one access requestor and at least one access provider. At least the payload portion of the received data packet typically is monitored, where monitoring the data packet includes scanning the payload portion for at least one predetermined pattern. When the payload portion is determined to include at least one predetermined pattern, access by the access requester to the access provider may be controlled.

Implementations may include one or more of the following features. For example, receiving a data packet may include receiving more than one data packet and monitoring the data packets may include counting the number of data packets having payload portions that include the predetermined pattern. Monitoring the data packet may include scanning the payload portion while handling the data packet with a switch.

When more than one data packet is received, monitoring the data packets may include monitoring only the data packets that may be distinguished. When more than one data packet is received, securing the accessible computer system further may include distinguishing from among the data packets received at least one of the data packets for additional processing, where monitoring the data packets includes monitoring the payload portion of at least the one distinguished data packet. A data packet may be distinguished based on an Internet address associated with the data packet. Additionally or alternatively, when more than one data packet is received, all of the received data packets may be monitored.

The access requester may include a client and the access provider may include a host. Data packets may be monitored when they are communicated from the client to the host and/or when they are communicated from the host to the client. The predetermined pattern may include a login failure message communicated from the host to the client. Data packets may include token-based protocol packets, TCP packets, and/or PPP packets.

Access by the access requester to the access provider may be controlled by denying access by the access requester to the access provider. Access also may be controlled by rerouting the access requester and/or by affecting the bandwidth for communications between the access requester and the access provider.

When more than one data packet is received, the access requestor may be denied access to the access provider when a number of payload portions that include the predetermined pattern exceed a configurable threshold number. Additionally or alternatively, the access requester may be denied access to the access provider when a number of payload portions that include the predetermined pattern exceed a configurable threshold number during a configurable period of time.

These general and specific aspects may be implemented using a system, a method, or a computer program, or any combination of systems, methods, and computer programs. Other features and advantages will be apparent from the description and drawings, and from the claims.

DESCRIPTION OF DRAWINGS

Like reference symbols in the various drawings indicate like elements.

DETAILED DESCRIPTION

Figure 1:
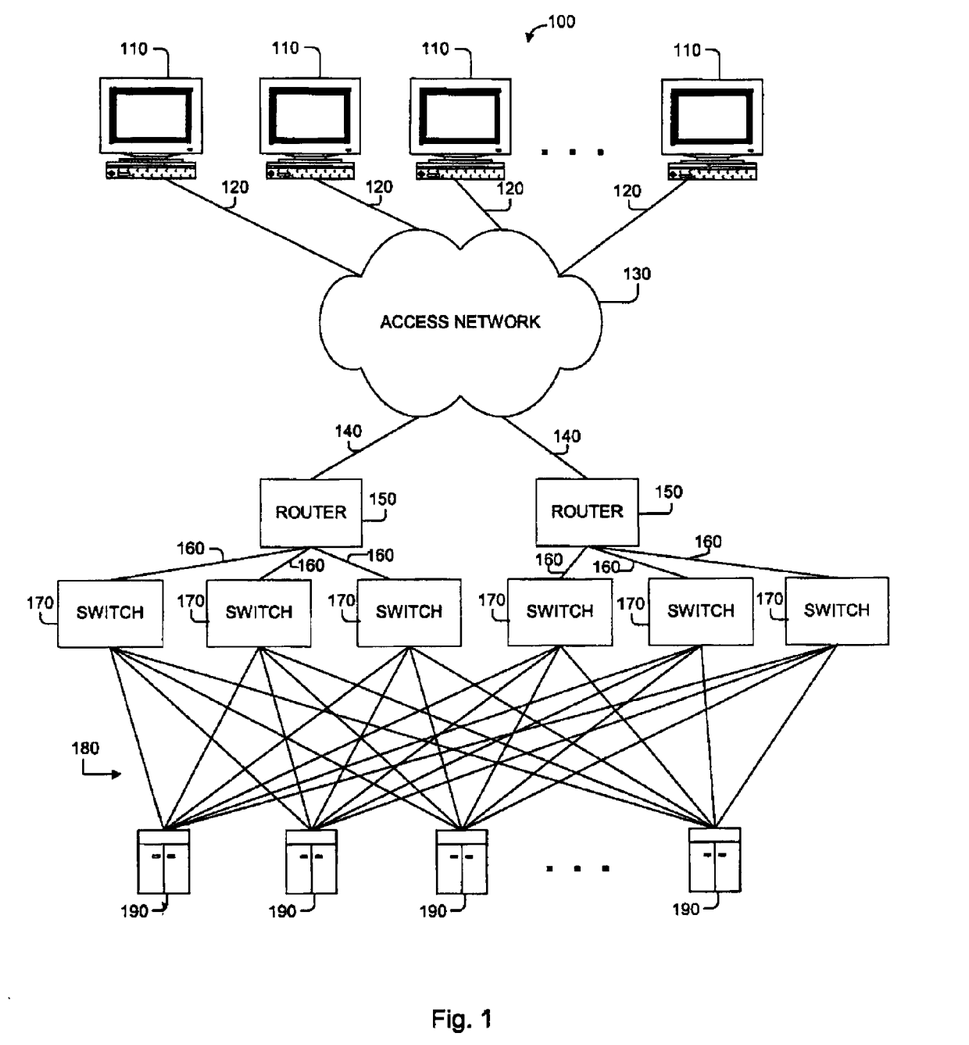
FIG. 1 is a block diagram that illustrates a physical level of an accessible computer system.

FIG. 1 is a block diagram that illustrates the physical level of an accessible computer system 100. FIG. 1 shows access requestors 110 connected through communication links 120 to an access network 130 that is connected through communication links 140 to routers 150. The routers 150 are connected through communication links 160 to switches 170 that are connected through communication links 180 to access providers 190.

An access requestor 110 may include a client, and may be embodied in a general-purpose computer (e.g., a personal computer), a special-purpose computer, a workstation, a server, a personal digital assistant, an electronic organizer, a mobile phone, a pager, a device, a component, or other physical or virtual equipment or some combination of these elements, any of which may be programmed or configured to respond to and execute instructions in a defined manner.

The Internet is an example of an access network 130 that may be used to enable communications to/from access requestors 110. Other examples of an access network 130 may include the World Wide Web, wide area networks (WANs), local area networks (LANs), analog or digital wired and wireless telephone networks (e.g. Public Switched Telephone Network (PSTN), Integrated Services Digital Network (ISDN), and Digital Subscriber Lines (xDSL)), radio, television, cable, satellite, and/or any other delivery mechanism for carrying data. The access network 130 generally is connected to one or more routers 150 by communication links 140.

Each router 150 generally includes a computer processor, computer software, a hardware device, other physical or virtual equipment or some combination of these elements that is capable of receiving, processing and transmitting information. In general, each router 150 routes communications between one or more access requestors 110 and one or more access providers 190. Communications received from an access provider 190 generally are routed to an access requestor 110 through the access network 130. Communications received from an access requestor 110 generally are routed to an access provider 190 through switch 170. More specifically, each router 150 receives a data packet and/or data request from access requestor 110 and routes the data packet and/or data request to one or more of the access providers 190 based on predefined criteria or algorithms. The routers 150 are connected to one or more switches 170 by communication links 160.

Switch 170 may include one or more hardware components and/or one or more software components. It is capable of receiving one or more units of data and of transmitting the received data to one or more access providers 190 or routers 150 based on predefined criteria or algorithms. Switch 170 may perform load balancing algorithms such as hashing techniques to avoid overwhelming any particular router 150 or access provider 190. Switch 170 also may perform the functions of the router 150 as a separate or integrated component or device. Additionally or alternatively, switch 170 may include one or more processors and one or more storage and memory devices, such as internal memory.

In some implementations, a switch 170 is structured and arranged to perform filtering and forwarding between different domains at the same level of the protocol stack in the OSI ("Open System Interconnection") reference model. For example, in some networks, switch 170 may forward Ethernet frames between different Ethernet segments. In another example, switch 170 may forward IP packets between different IP subnets.

Switch 170 may include a device that performs network operations and functions in hardware (e.g., a chip or part of a chip). In some implementations, the device may include an ASIC ("Application Specific Integrated Circuit") implementing network operations logic directly on a chip (e.g., logical gates fabricated on a silicon wafer and manufactured into a chip). For example, an ASIC chip may perform filtering by receiving a packet, examining the IP address of the received packet, and filtering based on the IP address by implementing a logical gate structure in silicon.

Implementations of the device included in the switch 170 may include using a Field Programmable Gate Array (FPGA). A FPGA generally is defined as including a chip or chips fabricated to allow third party designers to implement a variety of logical designs (e.g., group of gates) on the chip. For example, a third party designer may load a design within a FPGA to replace the received IP addresses with different IP addresses, or may load a design within the FPGA to segment and reassemble IP packets as they are modified while being transmitted through different networks.

Implementations of the switch 170 may include a network processor. A network processor generally is defined to include a chip or chips for allowing software to specify which network operations will be performed. A network processor may perform a variety of operations. One example of a network processor may include several interconnected RISC ("Reduced Instruction Set Computer") processors fabricated in a network processor chip. The network processor chip may implement software on some of the RISC processors that change an IP address of an IP packet. Other RISC processors in the network processor may implement software that maintains which terminals are receiving an IP stream. The switch 170 is connected to multiple access providers 190 by communication links 180.

An access provider 190 may include software or hardware components capable of providing access by an access requestor 110 to desired information or services. For instance, an access provider 190 may include a host (e.g., an Internet Service Provider (ISP)), and it may be implemented in a general-purpose computer (e.g., a personal computer) or a special-purpose computer capable of communicating with one or more access requestors 110 by responding to and executing instructions in a defined manner. Other examples of an access provider 190 include a special-purpose computer, a work station, a server, a device, a component, other physical or virtual equipment or some combination of these elements that is capable of responding to and executing instructions as described.

Communication links 120, 140, 160 and 180 may include, for example, a wired communication pathway, such as a cable connection, or a wireless communication pathway, such as a satellite link.

Figure 2:
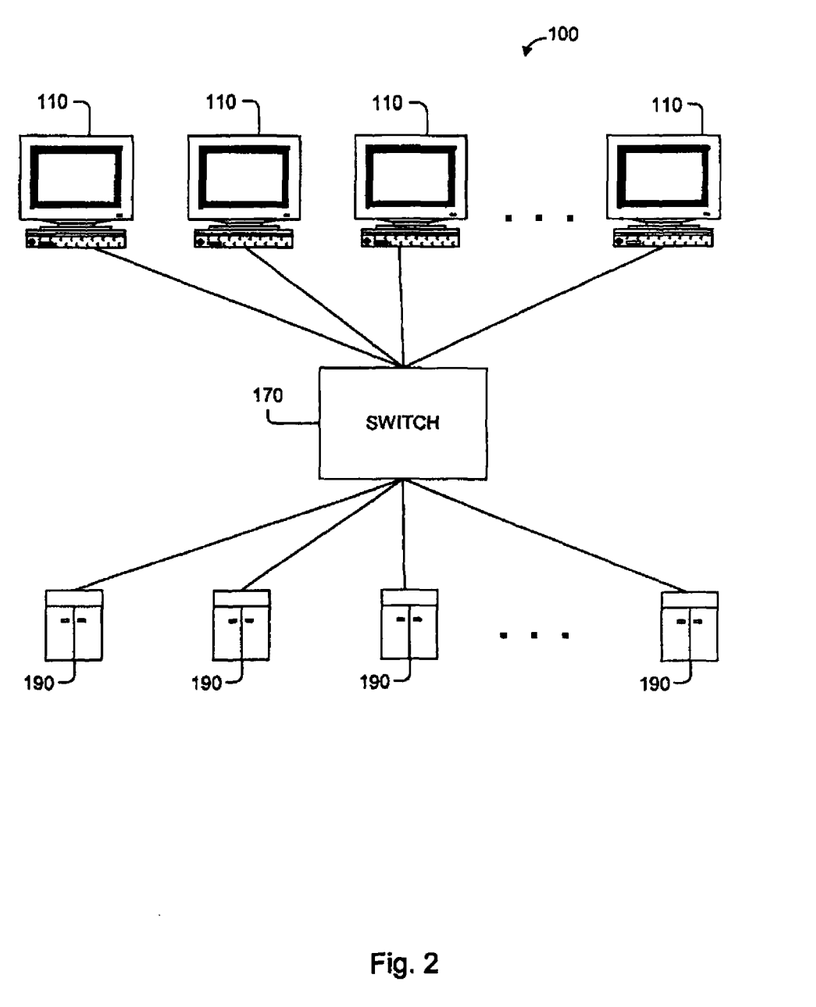
FIG. 2 is a block diagram that illustrates a logical level of the accessible computer system of FIG. 1.

FIG. 2 is a block diagram that illustrates a logical level of a system such as the system 100 illustrated in FIG. 1. FIG. 2 shows access requestors 110 connected to a switch 170 that is connected to access providers 190. In this figure, switch 170 may be representative of one or more of access network 130, router 150 and switches 170, or a combination of these such as the combination described with respect to FIG. 1.

An access requestor 110 generally is used to establish a physical or non-physical electronic connection with an access provider 190. Connections may be established on various levels using various protocols. For instance, a connection may be established on Level III (e.g., a packet based level), on Level IV (e.g., a protocol data unit based level with flow control and error correction) or on some other level (e.g., Level II) using an appropriate protocol capable of establishing a connection between an access requestor 110 and an access provider 190. More specifically, examples of protocols include Transmission Control Protocol (TCP), Internet Protocol (IP), TCP/IP, User Datagram Protocol (UDP), UDP/IP, Layer Two Tunneling Protocol (L2TP), Point-to-Point Protocol (PPP), and a token-based protocol.

Access protocols are observed to establish a connection. For example, an access requestor 110 may send an access request through switch 170. When one of the access providers 190 receives the request, it responds to the access request by sending an acknowledgement that is routed back to the access requestor 110 through switch 170. When the access requestor 110 receives the acknowledgement sent by the access provider 190, the access requestor 110 generates an acknowledgement that is sent back to the access provider 190 through switch 170. The completion of this transaction establishes a connection between the access requestor 110 and the access provider 190.

For purposes of this detailed description, the term connection transaction is used to describe one or more of sending, receiving, or exchanging the units of data necessary to use a protocol (e.g., TCP, IP, UDP, TCP/IP, UDP/IP, L2TP, PPP, and token-based) to establish a communications link (e.g., wired, wireless, cable, and satellite) between the access requestor 110 and the access provider 190. One example of a connection transaction results in a TCP connection between the access requestor 110 and the access provider 190, where procedures to establish a connection transaction use the synchronize (SYN) control flag and involve an exchange of three messages. In this example, an access requestor 110 sends an access request (SYN REQ) to an access provider 190 through switch 170. The access provider 190 responds to the access requestor 110 through switch 170 with an acknowledgement (SYN ACK). Then, the access requestor 110 sends an acknowledgement (ACK) to the access provider 190 through switch 170. Other connection transactions also are possible between access requestor 110 and access provider 190 through switch 170 and can result in different types of connections (e.g., IP, TCP/IP, UDP, UDP/IP, L2TP, PPP, and token-based).

Deep packet scanning may be performed by a switch-based application designed to assist in areas of hacker prevention. In general, the application typically executes a deep packet scan (e.g., parsing payload from packet header) on particular data passing through the switch 170 (e.g., an L2 switch). The application may look for predetermined patterns (e.g., defined "tokens") within at least the payload portion to identify hackers trying to penetrate host system security.

Figure 3:
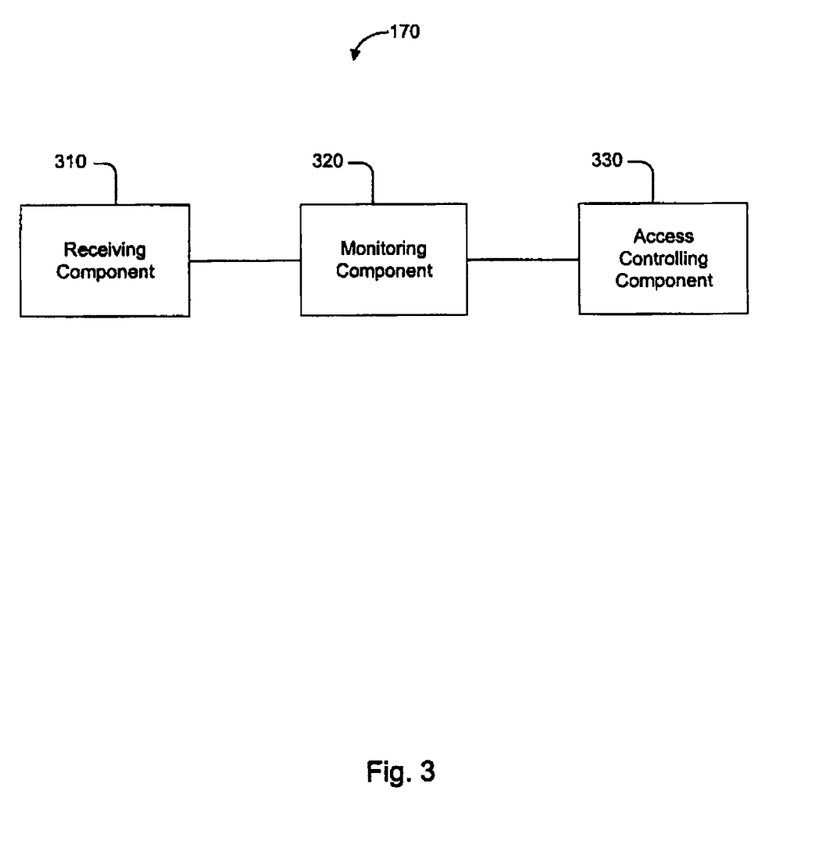
FIG. 3 is a block diagram that illustrates components included in a switch, such as those shown by FIGS. 1 and 2.

FIG. 3 shows one example of the logical components of a switch designed to perform deep packet scanning, such as switch 170. As shown, switch 170 may include the components necessary to perform a deep packet scan and to control access to access providers 190 by hackers. In particular, switch 170 may include a receiving component 310, a monitoring component 320, and an access controlling component 330. These components generally include one or more components embedded in software modules within a computing device, but may be embedded in physical devices connected to one another or may be embedded in some combination of software modules and physical devices. In other implementations, the components illustrated in FIG. 3 may be resident on an access provider 190.

The receiving component 310 typically is structured and arranged to receive one or more data packets that each include a payload portion and/or an attribute portion. Each data packet typically is communicated between at least one access requestor 110 and at least one access provider 190. The data packet may include any unit of data that is communicated between an access requestor 110 and an access provider 190 using any type of protocol. For example, a data packet may include a datagram, such as the unit of data communicated using UDP, and/or a token-based protocol packet. The payload portion may include the portion of the data packet that includes the main content of the data packet that is communicated. The attribute portion may include, for example, information identifying the particular data packet, control information, address information (e.g., source IP address and destination IP address), and/or information such as that included in a header.

The monitoring component 320 typically is structured and arranged to monitor at least the payload portion of the data packet received by the receiving component 310. In addition to the payload portion, the monitoring component 320 also may be structured and arranged to monitor the payload portion and/or the attribute portion of the data packet. More specific details regarding the receiving component 310 and monitoring component 320 are provided below with respect to FIGS. 4 and 5, respectively.

The access controlling component 330 is structured and arranged to control access by the access requestor 110 to the access provider 190 when one or a threshold number of data packets directed from the access requestor 110 to the access provider 190 are classified as suspect, e.g., as having payload portions that are determined to include one or more predetermined patterns. For example, access may be controlled by denying access by the access requestor 110 to the access provider 190, rerouting the access requestor 110, and/or affecting the bandwidth for communications between access requestor 110 and the access provider 190.

Figure 4:
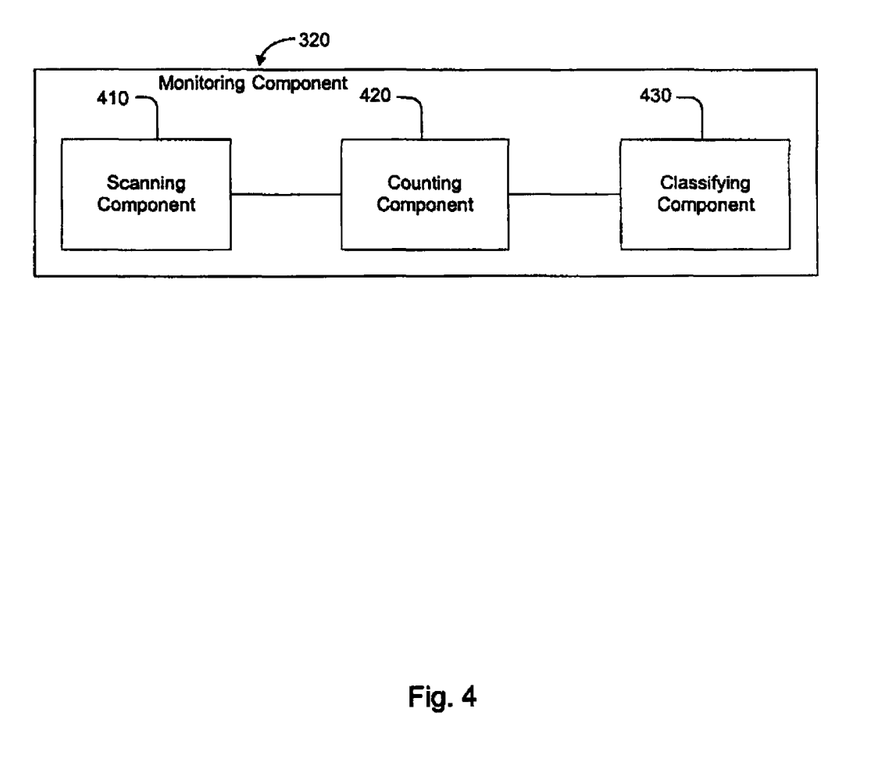
FIG. 4 is a block diagram that illustrates components included in a monitoring component of the switch of FIG. 3.

Referring to FIG. 4, the monitoring component 320 may include a scanning component 410, a counting component 420, and a classifying component 430. The scanning component 410 typically is structured and arranged to scan the payload portion of the data packet for one or more predetermined patterns.

The scanning component 410 may scan the payload portions in numerous ways. For example, the scanning component 410 may scan the payload portion of every data packet communicated between the access requestor 110 and access provider 190 for one of the predetermined patterns, including data packets communicated from the access requestor 110 to the access provider 190 and data packets communicated from the access provider 190 to the access requestor 110. Additionally or alternatively, the scanning component 410 may scan the payload portion of selected data packets being communicated between the access requestor 110 and access provider 190. For example, the scanning component 410 may scan only the payload portions communicated from the access provider 190 to the access requestor 110, it may scan only the payload portions communicated from the access requestor 110 to the access provider 190, or it may scan the payload portions of less than all data packets communicated in one or both directions between the access requestor 110 and the access provider 190 based on some selection criteria (e.g., data packets having attribute portions with certain characteristics, or data packets communicated during specified times or from specified origins). That is, the scanning component 410 may scan the payload portion of selected data packets that are received by the receiving component 310, including selected data packets communicated from the access requestor 110 to the access provider 190 and/or selected data packets communicated from the access provider 190 to the access requestor 110. Furthermore, the scanning component 410 may scan the payload portions using any combination of the above scanning patterns.

The scanning component 410 typically scans the payload portion of a data packet for at least one predetermined pattern. The predetermined pattern may be included in a payload portion communicated from the access requestor 110 to the access provider 190 and/or from the access provider 190 to the access requestor 110. In one implementation, the predetermined pattern may include the binary or hexadecimal equivalent of a login failure message that is communicated from the access provider 190 to the access requestor 110. In another implementation, the predetermined pattern may include the binary or hexadecimal equivalent of a login request message that is communicated from the access requestor 110 to the access provider 190.

For example, in one implementation, payload portions are scanned for login failure messages. The access requestor 110 typically sends a data packet to an access provider 190 that includes a payload portion having a login request and an attribute portion having the source IP address for the access requestor 110. The data packet and its embedded login request typically pass through switch 170, where they ordinarily are received by receiving component 310, scanned by the scanning component 410, and delivered to access provider 190. Typically, the access provider 190 responds to the login request data packet with one or more data packets that may indicate whether the login request has resulted or will result in a successful login. The payload portion of the data packets communicated by the access provider 190 in response to the login request data packet generally includes a payload portion with login success or login failure information and an attribute portion with the IP address of the access requestor 110 that sent the login request. Thus, when the login request does not or will not result in a successful login, the access provider 190 typically generates and sends one or more data packets to the access requestor 110 that may include login failure information. The login failure information may include the binary, hexadecimal, numeric, or alphanumeric equivalent of one or more login failure reasons, for example, an incorrect login name or an incorrect password. The login failure message may be identified by any one of several predetermined patterns. In one implementation, the login failure message includes a pattern that may be a sixteen byte signature located at a specific offset from the end of one of the data packets communicated from the access provider 190 to the access requestor 110. Other types of predetermined patterns also are possible, including patterns using, for example, varying the number of bytes, the protocol, the offset, or the location in a data packet. The scanning component 410 may be programmed to scan the payload portion of the data packet for any or all of these predetermined patterns.

Furthermore, the predetermined pattern may be established based on the detected occurrence of data patterns among received access requests or other communications between access requestor 110 and access provider 190, or between a group (physical or logical) of access requestors 110 and access providers 190. For example, a repetitive sequence of data reflecting access requests submitted by a single access requestor 110 or several access requestors 110 to one or more access providers 190 may be used to define a predetermined pattern for contemporaneous or future scanning.

In one implementation, the scanning component 410 may scan a configurable number of data packets for a predetermined pattern associated with a particular access requestor 110. For example, the predetermined patterns may be included in any of several packets communicated from the access provider 190 to the access requestor 110 following the data packet that included the login request communicated from the access requestor 110 to the access provider 190. When the data packet that includes the login request is received by receiving component 310, the scanning component 410 may use information from the attribute portion of that data packet to identify the source of the data packet. For instance, the scanning component 410 may use the source IP address information included in the attribute portion of that data packet to identify the source of the data packet. The source IP address may be copied and stored in a table of IP addresses kept for all of the login requests received by receiving component 310. Then, the payload portions of data packets that include the IP address in the attribute portion may be scanned. The scanning component 410 may scan a configurable number of payload portions within data packets associated with a tabled IP address. When the configurable number of payload portions have been scanned without revealing one or a threshold number or ratio of packets including the predetermined pattern, then the IP address may be removed from the table such that scanning of data packets is no longer performed as a function of their association with the now untabled IP address. In another implementation, a similar methodology may be employed to enable scanning of messages cumulatively received from several different access requestors 110.

The counting component 420 may be structured and arranged to perform various different counting functions. For example, the counting component 420 typically is structured and arranged to count a number of payload portions that are received by receiving component 310. Thus, the counting component 420 may count the number of payload portions received by the receiving component 310 and that are associated with IP addresses that have been tabled so that it may be determined when the configurable number of payload portions for the identified IP address has been reached. Additionally or alternatively, the counting component 420 may be structured and arranged to count the number of payload portions of data packets that include a predetermined pattern. For instance, if more than a predetermined number of suspect messages are determined to have been received from the access requester 110 or the group of access requesters 110, further suspect messages from the one or more access requesters 110 may be blocked or otherwise filtered or controlled by the access controlling component 330.

The classifying component 430 may be structured and arranged to determine whether an access requester 110 is "suspicious." The classifying component 430 may determine whether an access requester 110 is suspicious based on information from the counting component 420. For example, when the counting component 420 counts a number of payload portions that include a predetermined pattern from a particular access requester 110 or a particular group of access requesters 110 that meets or exceeds a configurable threshold number, then the classifying component 430 may classify that access requester 110 or group of access requesters 110 as suspicious. A suspicious access requester 110 or the source IP address of the suspicious access requester 110 may be monitored by monitoring component 320 by having its IP address placed on an exception list such that access is controlled (e.g., denied) to the access providers 190. Conversely, a list may be provided to identify access requesters 110 that have been identified as secure and/or trusted and for which monitoring is deemed unnecessary, or a combination of these lists may be used.

Figure 5:
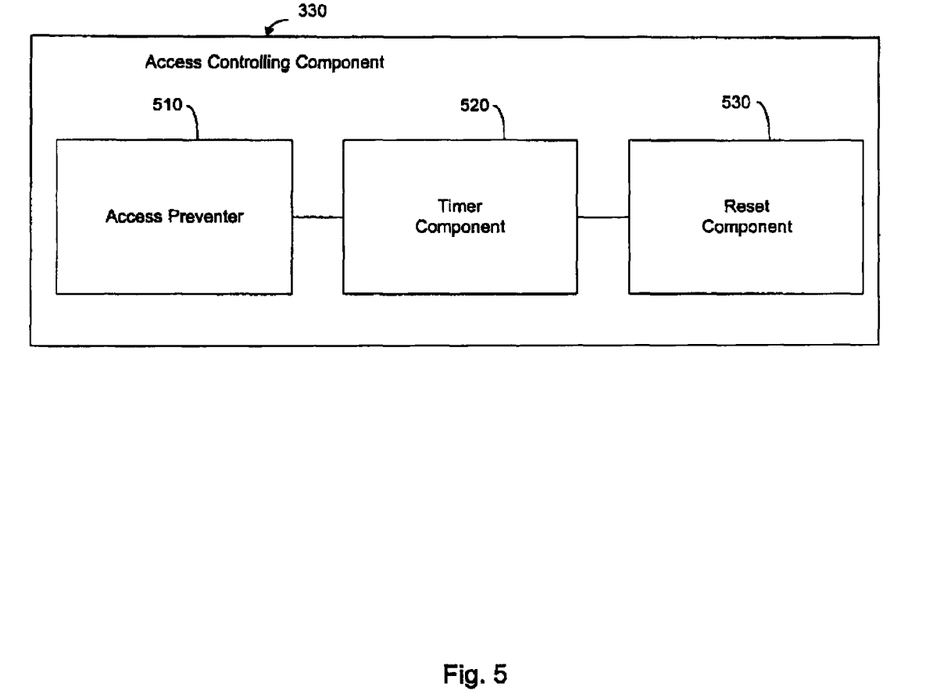
FIG. 5 is a block diagram that illustrates components included in an access controlling component of the switch of FIG. 3.

Referring to FIG. 5, the access controlling component 330 typically includes an access preventer 510, a timer component 520, and a reset component 530. The access preventer 510 typically is structured and arranged to control access to an access provider 190 by an access requester 110 that has been classified as suspicious by monitoring component 320. For example, in one implementation, when the classifying component 430 of monitoring component 320 classifies an access requester 110 as suspicious, the access preventer 510 may deny access by the suspicious access requester 110 forevermore, or for a configurable period of time. Similarly, when a group of access requesters 110 are classified by the classifying component 430 as suspicious, the access preventer 510 may deny access by the entire group of access requesters 110.

The access preventer 510 may effect this denial of access by a suspicious access requester 110 by holding down the IP address associated with the particular access requester 110 in the table of IP addresses. For instance, the access preventer 510 may include or access an exception list (e.g., access or exclusion list) that identifies a list of IP addresses corresponding to suspicious access requestors for which access will be permitted or denied. In one example, the scanning component 410 may identify a payload portion as corresponding to a specific access requestor 110 associated with an IP address. Before denying access by an access requestor 110 having a specific IP address, the access preventer 510 may first check the exception list and determine whether the access requestor 110 or its IP address is identified as suspicious and therefore listed on the exception list. In this implementation, if the access requestor 110 or its IP address is not on the exception list, then the access preventer 510 will allow that access requestor 110 access to the access provider 190.

In another implementation, the access preventer 510 may control access by rerouting the access requestor 110. Additionally or alternatively, the access preventer 510 may control access by affecting the bandwidth for communications between the access requestor 110 and the access provider 190 (e.g., by decreasing the available bandwidth).

In another implementation, a list of IP address may be maintained for access requestors 110 that may be permitted access to the access providers 190 notwithstanding a classification as suspicious. Thus, before denying access to a suspicious access requestor, or perhaps even before or during classification by monitoring component 320, this list may be checked to determine whether the IP address for an access requestor is eligible for access. For instance, in the case where a single IP address may be used by multiple access requestors 110 communicating with access providers 190 through a network address translator (NAT) device, this IP address may be included on the list of IP address that may be permitted access even if classified as suspicious to avoid denying access to all of the access requestors communicating through the NAT device based on suspicious activity by less than all of the access requestors 110.

Moreover, the access preventer 510 may deny access by a specific access requestor 110 based on a classification of that access requestor 110 as suspicious by the classifying component 430 when the scanning component 410 and the counting component 420 identify a configurable number or ratio of payload portions that include a predetermined pattern.

The timer component 520 may be structured and arranged to measure various configurable periods of time. For example, the timer component 520 may be structured and arranged to measure the configurable period of time during which the access preventer 510 denies access by the access requestor 110. In one implementation, the timer component 520 may measure the configurable period of time that an IP address from a particular, e.g., suspicious, access requestor 110 is denied access.

Additionally or alternatively, the timer component 520 may be structured and arranged to measure the configurable period of time during which a configurable number of payload portions including a predetermined pattern are communicated through the switch 170. If a configurable number of payload portions including a predetermined pattern are identified within the configurable period of time, then the access preventer 510 denies access by the access requestor 110.

Reset component 530 typically is structured and arranged to reset the configurable period of time measured by timer component 520 for which an access requestor 110 is denied access if the receiving component 320 receives a new packet of data sent from such an access requestor 110. For example, if the access requestor 110 that is being denied access sends a new login request during the configurable period of time that it is being denied access, reset component 530 will start a new time period during which the access requestor 110 will continue to be denied access. In this manner, traffic from a blocked access requestor 110 may continue being blocked until the access requestor 110 has refrained from submitting an access request for at least a configurable period of time.

In addition to the above components and features typically included on switch 170, the switch 170 may be programmed to include additional features. For instance, switch 170 may be programmed to include a current denied access table, which may include a source IP address, the time period remaining for denying access, and a number of times a specific IP address has been denied access. The switch 170 also may be capable of sending a message to a system monitor that includes the information included in the current denied access table. Additionally, the components included on switch 170 may be programmed by a user using a Command Line Interface (CLI).

In one implementation, the components included on switch 170 may process in excess of fifty thousand data packets per second. In general, the switch 170 typically can support a minimum of two Fiber Gigabit Ethernet Interfaces (SC), and/or a minimum of twenty four Fast Ethernet interfaces (RJ45).

Figure 6:
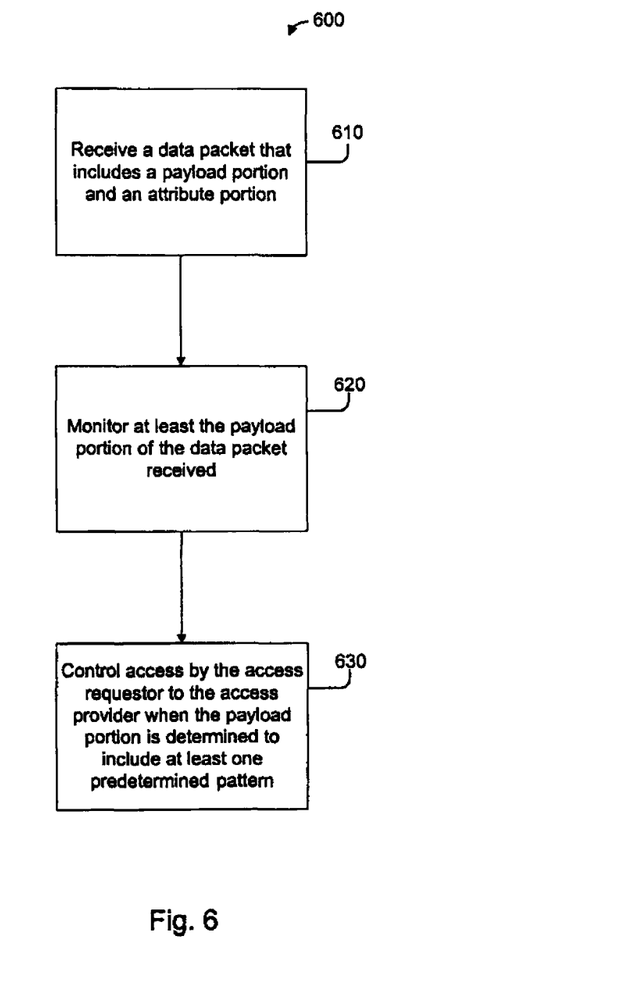
FIG. 6 is a flow chart illustrating a process for securing an accessible computer system, which may be performed by the systems shown by FIGS. 1-5.

FIG. 6 illustrates a process 600 for securing an accessible computer system, which generally includes receiving a data packet (step 610), monitoring at least a payload portion of the data packet (step 620), and controlling access based on the payload contents (step 630). This process 600 typically is performed by a system such as the system described above with respect to FIGS. 1-5. For instance, process 600 may be performed by a switch 170, by an access provider 190, or by a combination of the two. Process 600 also may be performed by any other hardware device or software device capable of being programmed to receive, process, and send instructions in the manner described.

More specifically, process 600 includes receiving a data packet that includes a payload portion and an attribute portion (step 610), where the data packet typically is communicated between at least one access requestor and at least one access provider. In this sense, receiving a data packet (step 610) also may include receiving multiple data packets, where each data packet includes a payload portion and/or an attribute portion. At least the payload portion of the data packet received is monitored (step 620). Monitoring at least the payload portion of the data packet (step 620) generally involves checking the payload portion for a predetermined pattern of data, but also may include monitoring the payload portion and/or the attribute portion of the data packet. More details of one exemplary monitoring process are described with respect to FIG. 7. Based on whether the payload portion is determined to include at least one predetermined pattern, access by the access requestor to the access provider may be controlled (step 630), e.g., as described with respect to FIGS. 7 and 8.

Figure 7:
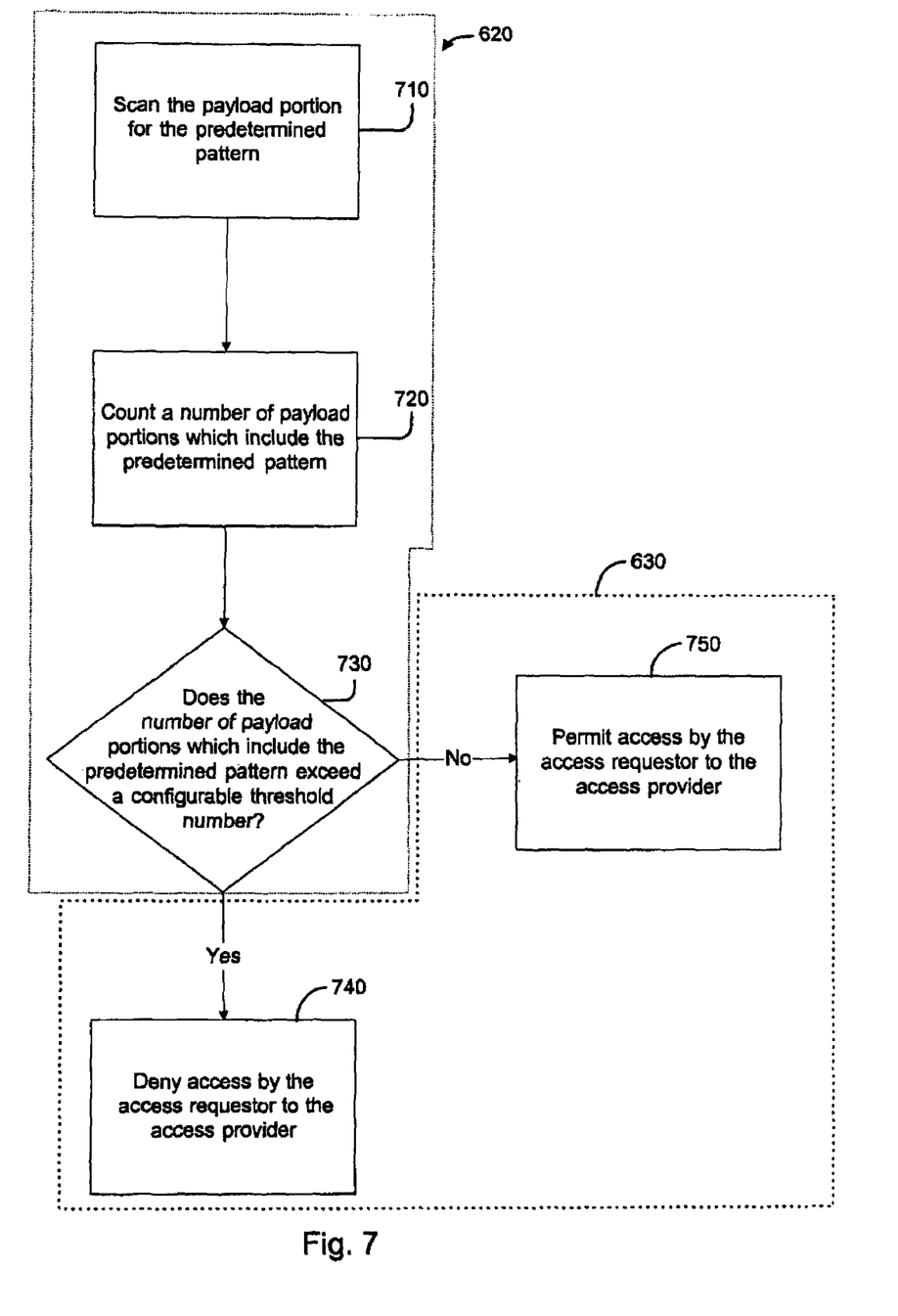
FIG. 7 is a flow chart illustrating a process for monitoring the computer system for data packets as part of the process of FIG. 6.

Referring to FIG. 7, monitoring at least the payload portion of the data packet (e.g., step 620 of FIG. 6) may include scanning the payload portion for one or more predetermined patterns (step 710). Scanning the payload portion (step 710) may be performed in numerous ways. For example, scanning the payload portion (step 710) may include scanning the payload portion of every data packet communicated between the access requestor and access provider for one of the predetermined patterns, including data packets communicated from the access requestor to the access provider and data packets communicated from the access provider to the access requestor. Additionally or alternatively, scanning the payload portion (step 710) may include scanning the payload portion of selected data packets being communicated between the access requestor and access provider. For example, only the payload portions communicated from the access provider to the access requestor may be scanned, or only the payload portions communicated from the access requestor to the access provider may be scanned, or the payload portions of less than all data packets communicated in one or both directions between the access requestor and the access provider may be selected based on some selection criteria and scanned (e.g., data packets having attribute portions with certain characteristics, or data packets communicated during specified times or from specified origins). Furthermore, scanning the payload portion (step 710) may include scanning the payload portion using any combination of the above scanning methods.

Scanning the payload portion (step 710) typically, includes scanning the payload portion of a data packet for at least one predetermined pattern. Examples of predetermined patterns that may be included in the payload portion are discussed above. In one example implementation, scanning the payload portion (step 710) may include scanning the payload portion for login failure massages. In this case, a data packet typically is received (step 610) from an access requestor that includes a payload portion having a login request and an attribute portion having the source IP address for the access requestor. The data packet and its embedded login request then are delivered to an access provider. Typically, the access provider responds to the login request data packet with one or more data packets that may indicate whether the login request has resulted or will result in a successful login. The payload portion of the data packets communicated by the access provider in response to the login request data packet generally include a payload portion with the login success or login failure information and an attribute portion with the IF address of the access requestor that sent the login request. Thus, when a login request does not or will not result in a successful login, the access provider typically generates and sends one or more data packets to the access requestor that may include login failure information, as discussed above. The data packet including the login failure information typically is received (step 610) and the payload portion is scanned for the login failure information (i.e., a predetermined pattern) (step 710).

Furthermore, the predetermined pattern may be established based on the detected occurrence of data patterns among received access requests (step 610) or other communications between access requestor and access provider, or between a group (physical or logical) of access requestors and access providers. For example, a repetitive sequence of data reflecting access requests submitted by a single access requestor or several access requestors to one or more access providers may be used to define a predetermined pattern for contemporaneous or future scanning.

By scanning the payload portion (step 710) for a configurable number of data packets associated with a particular access requestor, it is possible to count a number of payload portions which include the predetermined pattern (step 720) and to determine whether the number of payload portions which include the predetermined pattern exceed a configurable threshold number (step 730), and thus to monitor the received data packets (step 620).

Counting a number of payload portions (step 720) may include performing various types of counts. For example, counting a number of payload portions (step 720) may include counting the number of payload portions received that are associated with IP addresses that have been tabled to determine when the configurable number of payload portions for the identified IP address has been reached. Additionally or alternatively, counting a number of payload portions (step 720) may include counting the number of payload portions of data packets that include a predetermined pattern.

The number of payload portions counted generally are compared against a threshold to determine whether the source of the data packets is suspicious. Then, based on the determination made in step 730, access may be controlled in step 630. For instance, if the number of payload portions which include the predetermined pattern is determined in step 730 to meet or exceed the configurable threshold number, then the access requestor is denied access to the access provider (step 740). If the number of payload portions which include the predetermined pattern does not meet or exceed the configurable threshold number, then the access requestor is permitted access to the access provider (step 750).

More specifically, controlling access by the access requestor to the access provider (step 630) may include denying access by the access requestor forevermore, or for a configurable period of time (step 740). For example, in one implementation, when the scanning the payload portion (step 710) identifies a predetermined pattern in a payload portion of a data packet, access may be denied by the access requestor that communicated the data packet to the access provider. In other example implementations, access may be denied by the access requestor to the access provider only after a configurable number of payload portions that include a predetermined pattern have been counted or access may be denied to an entire group of access requestors that have singularly or collectively been identified as suspicious.

Controlling access (step 630) may be achieved by holding down an IP address associated with a specific access requestor in the table of IP addresses. Additionally or alternatively, prior to denying access (step 630) by an access requestor having a specific IP address, the TP address may be compared against an exception list (e.g., access or exclusion list) to determine whether the IP address is included in the exception list. If the IP address is on the exception list, then the access requestor will be allowed or denied access to the access provider, as appropriate.

Additionally or alternatively, controlling access (step 630) may include rerouting the access requestor and/or affecting the bandwidth for communications between the access requestor and the access provider.

In the above implementation, specific data packets may be identified for scanning by using the IP address included in the attribute portion of the data packet. For instance, when the data packet including the login request is received (step 610), the source IP address may be copied and stored temporarily in a table of IP addresses kept for all of the login requests that are received. Then, a configurable number of payload portions within data packets having attribute portions that include an identified and/or tabled IP address may be scanned (step 710), and suspect data packets counted (step 720). When the configurable number of payload portions have been scanned without revealing one or a threshold number or ratio of packets including the predetermined pattern (step 730), then the IF address may be removed from the table such that access by the access requester is permitted (step 740) and scanning of data packets is no longer performed as a function of their association with the now untabled IP address. In another implementation, a similar methodology may be employed to enable scanning of messages cumulatively received from several different access requestors.

Figure 8:
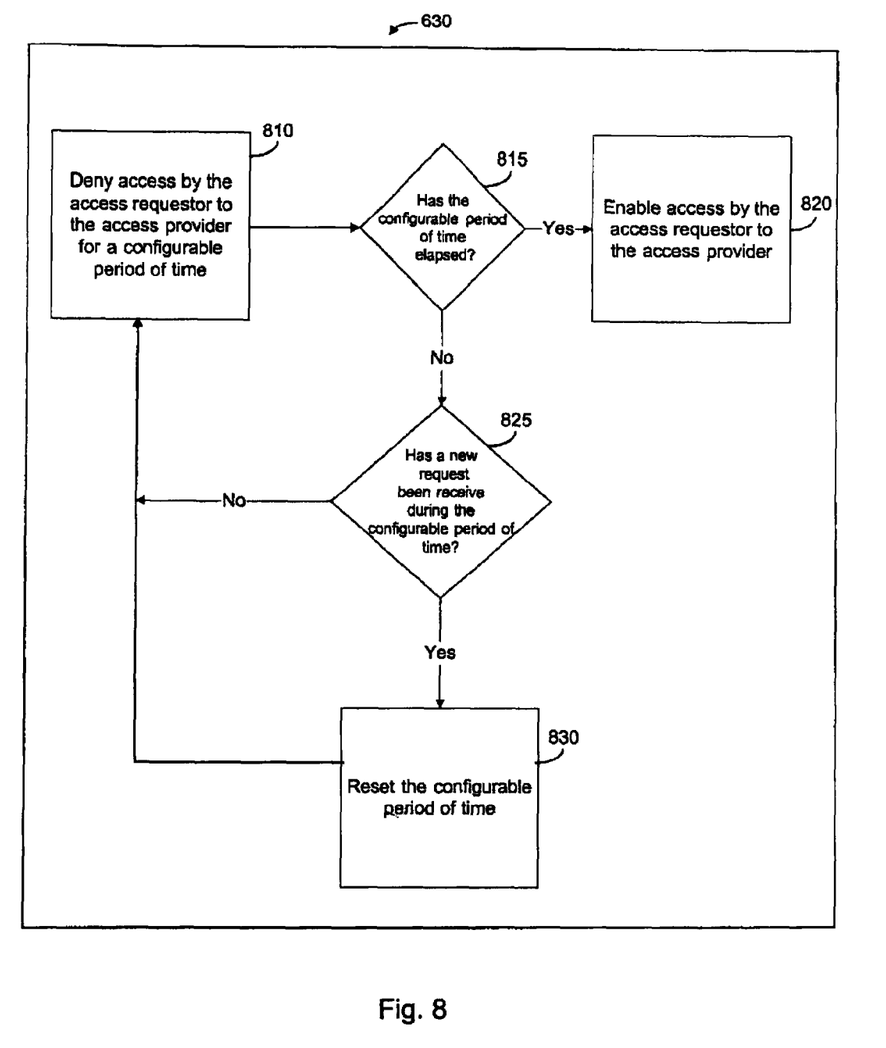
FIG. 8 is a flow chart illustrating a process for controlling access to access providers as part of the process of FIG. 6.

Referring to FIG. 8, another implementation of controlling access (step 630) is described. As shown, controlling access may include denying access to a specific access requestor when a configurable number or ratio of payload portions is determined to include a predetermined pattern over a configurable period of time (step 810). If the configurable period of time has elapsed (step 815), then the access requestor is allowed to access the access provider (step 820). If the configurable period of time has not elapsed (step 815), then a query is made as to whether a new request from the blocked access requestor has been received (step 825). If a new login request has been received from the blocked access requestor during the configurable period of time (step 825), then the configurable period of time may be reset (step 830). If a new login request has not been received from the blocked access requestor (step 825), then access is still denied for the remaining configurable period of time, but the configurable period of time is not reset.

Additionally or alternatively, other components and processes may be used to identify suspicious access requestors and control access to those access requestors. For example, activities may be monitored following a successful login of an access requestor to an access provider, such as, for example by monitoring user account login records. A back-end network component may monitor, for example, these user account login records for patterns of suspicious activity that may go undetected by the monitoring process on switch 170. For patterns of suspicious activity discovered by the back-end network component, the back-end network component may notify switch 170 to control access to these particular access requestors (e.g., by denying them access).

The systems, methods and techniques described here may be implemented in digital electronic circuitry, computer hardware, firmware, software, or combinations of these media. Implementations may include appropriate input and output devices, a computer processor, and a computer program product tangibly embodied in a machine-readable storage device for execution by a programmable processor. Implementations may include a programmable processor executing a program of instructions to perform desired functions by operating on input data and generating appropriate output. Implementations may include one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or an interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of implementations have been described. Nevertheless, it will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method comprising:
   receiving a plurality of data packets communicated to an access provider for a computer system, each data packet including a payload portion and an attribute portion;
   identifying, from the attribute portion of at least one of the plurality of data packets, an IP address of at least one source of said at least one of the plurality of data packets;
   storing, in a data structure, an indication that received packets associated with the IP address are to be scanned;
   identifying one or more predetermined patterns at least by scanning at least one payload portion of the plurality of data packets, each of said at least one payload portion being associated with the IP address;
   controlling access of the at least one source to the computer system based on whether a quantity of the one or more predetermined patterns exceeds a threshold; and
   selecting to remove from the data structure or maintain in the data structure the indication that received packets associated with the IP address are to be scanned, said selecting being based on whether the quantity of the one or more predetermined patterns exceeds the threshold.

2. The method of claim 1, wherein controlling access of the at least one source to the computer system comprises denying access of the at least one source to the computer system when the quantity of the one or more predetermined patterns is higher than the threshold and the IP address is not included in an access list.

3. The method of claim 1, wherein controlling access of the at least one source to the computer system comprises allowing access of the at least one source to the computer system when the IP address is included in an access list.

4. The method of claim 1, wherein controlling access of the at least one source to the computer system comprises allowing access of the at least one source to the computer system when the quantity of the one or more predetermined patterns is lower than the threshold and the IP address is not included in an exclusion list.

5. The method of claim 1, wherein controlling access of the at least one source to the computer system comprises denying access of the at least one source to the computer system when the IP address is included in an exclusion list.

6. The method of claim 1, further comprising:
   scanning at least one additional payload portion of the plurality of data packets, each of said at least one additional payload portion being associated with one IP address that is different from the IP address; and
   controlling access of at least one different source to the computer system based on scanning the at least one additional payload portion, each of the at least one different source being associated with said one IP address.

7. The method of claim 1, wherein removing from the data structure the indication that received packets are to be scanned includes removing IP address from a table when the quantity of the one or more predetermined patterns is lower than the threshold.

8. The method of claim 7, further comprising:
   scanning one or more payload portions associated with remaining IP addresses in the table, wherein the remaining IP addresses are associated with one or more remaining sources; and controlling access of the one or more remaining sources to the computer system based on scanning the one or more payload portions associated with remaining IP addresses in the table.

9. The method of claim 2, wherein denying access of the at least one source to the computer system comprises at least one of:
decreasing available bandwidth for communications from the at least one source;
rerouting communications from the at least one source; or
denying communications from the at least one source for a configurable period of time.

10. The method of claim 5, wherein denying access of the at least one source to the computer system comprises at least one of:
decreasing available bandwidth for communications from the at least one source;
rerouting communications from the at least one source; or
denying communications from the at least one source for a configurable period of time.

11. A computing device, comprising:
one or more processors; and
memory storing instructions that, when executed by the one or more processors, cause the computing device to:
receive a plurality of data packets communicated to an access provider for a computer system, each data packet including a payload portion and an attribute portion;
identify from the attribute portion of at least one of the plurality of data packets an IP address of at least one source of said at least one of the plurality of data packets;
store, in a data structure, an indication that received data packets associated with the IP address are to be scanned;
identify one or more predetermined patterns at least by scanning at least one payload portion of the plurality of data packets, each of said at least one payload portion being associated with the IP address;
control access of the at least one source to the computer system based on whether a quantity of the one or more predetermined patterns exceeds a threshold; and
select to remove from the data structure or maintain in the data structure the indication that received packets associated with the IP address are to be scanned, said selecting being based on whether the quantity of the one or more predetermined patterns exceeds the threshold.

12. The computing device of claim 11, wherein controlling access of the at least one source to the computer system comprises denying access of the at least one source to the computer system when the quantity of the one or more predetermined patterns is higher than the threshold and the IP address is not included in an access list.

13. The computing device of claim 11, wherein controlling access of the at least one source to the computer system comprises allowing access of the at least one source to the computer system when the IP address is included in an access list.

14. The computing device of claim 11, wherein controlling access of the at least one source to the computer system comprises allowing access of the at least one source to the computer system when the quantity of the one or more predetermined patterns is lower than the threshold and the IP address is not included in an exclusion list.

15. The computing device of claim 11, wherein controlling access of the at least one source to the computer system comprises denying access of the at least one source to the computer system when the IP address is included in an exclusion list.

16. The computing device of claim 11, wherein the instructions, when executed by the one or more processors, further cause the computing device to:
scan at least one additional payload portion of the plurality of data packets, each of said at least one additional payload portion being associated with one IP address that is different from the IP address; and
control access of at least one different source to the computer system based on scanning the at least one additional payload portion, each of the at least one different source being associated with said one IP address.

17. The computing device of claim 11, wherein removing from the data structure the indication that received packets are to be scanned includes removing the IP address from a table when the quantity of the one or more predetermined patterns is lower than the threshold.

18. The computing device of claim 17, wherein the instructions, when executed by the one or more processors, further cause the computing device to:
scan one or more payload portions associated with remaining IP addresses in the table, wherein the remaining IP addresses are associated with one or more remaining sources; and
control access of the one or more remaining sources to the computer system based on scanning the one or more payload portions associated with remaining IP addresses in the table.

19. The computing device of claim 12, wherein denying access of the at least one source to the computer system comprises at least one of:
decreasing available bandwidth for communications from the at least one source;
rerouting communications from the at least one source; or
denying communications from the at least one source for a configurable period of time.

20. One or more non-transitory computer-readable media storing instructions configured to, when executed by one or more computing devices, cause the one or more computing devices to:
receive a plurality of data packets communicated to an access provider for a computer system, each data packet including a payload portion and an attribute portion;
identify from the attribute portion of at least one of the plurality of data packets an IP address of at least one source of said at least one of the plurality of data packets;
store, in a data structure, an indication that received data packets associated with the IP address are to be scanned;
identify one or more predetermined patterns at least by scanning at least one payload portion of the plurality of data packets, each of said at least one payload portion being associated with the IP address;
control access of the at least one source to the computer system based on whether a quantity of the one or more predetermined patterns exceeds a threshold; and
select to remove from the data structure or maintain in the data structure the indication that received packets associated with the IP address are to be scanned, said selecting being based on whether the quantity of the one or more predetermined patterns exceeds the threshold.

* * * * *